United States Patent
Krause et al.

(10) Patent No.: US 12,461,115 B2
(45) Date of Patent: Nov. 4, 2025

(54) COMPUTERIZED METHOD AND LABORATORY EQUIPMENT FOR FAST DETECTION OF FAILURE IN LABORATORY EQUIPMENT

(71) Applicant: Roche Diagnostics Operations, Inc., Indianapolis, IN (US)

(72) Inventors: Friedemann Krause, Penzberg (DE); Ruediger Laubender, Pullach im Isartal (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 403 days.

(21) Appl. No.: 17/643,260

(22) Filed: Dec. 8, 2021

(65) Prior Publication Data

US 2022/0099690 A1  Mar. 31, 2022

Related U.S. Application Data

(63) Continuation of application No. PCT/EP2020/065479, filed on Jun. 4, 2020.

(30) Foreign Application Priority Data

Jun. 13, 2019 (EP) .................... 19180020

(51) Int. Cl.
- *G01N 35/00* (2006.01)
- *G05B 23/02* (2006.01)

(Continued)

(52) U.S. Cl.
CPC ... *G01N 35/00623* (2013.01); *G05B 23/0235* (2013.01); *G16H 10/40* (2018.01); *G16H 40/40* (2018.01); *G01N 2035/00653* (2013.01)

(58) Field of Classification Search
CPC ... G01N 35/00623; G01N 2035/00653; G05B 23/0235; G16H 10/40; G16H 40/40
See application file for complete search history.

(56) References Cited

U.S. PATENT DOCUMENTS

| | | | | |
|---|---|---|---|---|
| 5,633,166 A | * | 5/1997 | Westgard | G01N 33/50 436/15 |
| 5,937,364 A | * | 8/1999 | Westgard | G06Q 10/06395 705/7.41 |

(Continued)

FOREIGN PATENT DOCUMENTS

| | | |
|---|---|---|
| JP | 2005524049 A | 8/2005 |
| JP | 2012527690 A | 11/2012 |

(Continued)

OTHER PUBLICATIONS

International Search Report issued Aug. 14, 2020, in Application No. PCT/EP2020/065479, 2 pp.

(Continued)

*Primary Examiner* — Manuel L Barbee
(74) *Attorney, Agent, or Firm* — Taft Stettinius & Hollister LLP

(57) ABSTRACT

A computer-implemented method for determining failures in laboratory equipment comprising: a) receiving a desired probability of false rejection ($P_{fr}$) and a desired error detection rate ($E_D$), such as a desired probability of error detection ($P_{ed}$), relating to one or more QC levels (J) of quality control (QC) samples to be processed by the equipment; b) setting a number of runs (R) to one; c) calculating an error detection rate ($\hat{E}_D$) based at least partially on R; d) determining if $\hat{E}_D$ is below $E_D$, and if so: increase R by one, and repeat steps c) to d), and if not: define a rule for determining failures in the laboratory equipment based, at least partially, on R; e) receiving or collecting standardized QC results; f) applying the rule defined in step d) to the standardized QC results; g)

(Continued)

determining failures in the equipment, if the standardized QC results comply with the rule.

16 Claims, 2 Drawing Sheets

(51) Int. Cl.
*G16H 10/40* (2018.01)
*G16H 40/40* (2018.01)

(56) References Cited

U.S. PATENT DOCUMENTS

2003/0097238 A1   5/2003   Harmon
2012/0330866 A1   12/2012  Parvin et al.

FOREIGN PATENT DOCUMENTS

| | | |
|---|---|---|
| JP | 2014527214 A | 10/2014 |
| JP | 2017009362 A | 1/2017 |
| JP | 2019023771 A | 2/2019 |
| WO | 1997/042588 A1 | 11/1997 |

OTHER PUBLICATIONS

Written Opinion of the International Searching Authority, European Patent Office, International Patent Application No. PCT/EP2020/065479, Dec. 17, 2020, 6 pages.
International Preliminary Report on Patentability, The International Bureau of WIPO, International Patent Application No. PCT/EP2020/065479, Dec. 23, 2021, 7 pages.

* cited by examiner

COMPUTERIZED METHOD AND LABORATORY EQUIPMENT FOR FAST DETECTION OF FAILURE IN LABORATORY EQUIPMENT

CROSS-REFERENCE TO RELATED APPLICATIONS

This application is a continuation of International Patent Application No. PCT/2020/065479, filed 4 Jun. 2020, which claims priority to European Patent Application No. 19180020.0, filed 13 Jun. 2019, the disclosures of which are hereby incorporated by reference in their entirety.

BACKGROUND

The selection and implementation of a quality control (QC) rule is a crucial step in a laboratory in order to ensure the release of correct test results from patients' samples. It is further crucial that failures are identified as soon as possible to prevent incorrect results from being dispatched, as well as to limit the number of samples that have to be reprocessed.

Today's laboratory equipment may offer several different types of diagnostic tests, which can amount to several hundreds of diagnostic tests (each diagnostic test may test a particular substance). In order to guarantee valid test results for a patient's sample, quality control (QC) samples may be used and monitored for each test. It is often a pre-requisite of monitoring quality control samples, to select and implement a statistical quality control rule for each test.

Designing statistical procedures for evaluating laboratory equipment may include a requirement of error detection (such as probability of error detection ($P_{ed}$)) and/or requirements on false rejections, such as a probability of false rejection ($P_{fr}$). If the equipment has a failure resulting in "out-of-control" state of the laboratory equipment, then a high probability of detecting that failure is aimed for ($P_{ed}$ or "power" of 90% is usually aimed for in the art). However, if the equipment is "in-control", then there should be a low probability that the procedure identifies a failure based on results ($P_{fr}$ of 5% or 1% is usually aimed for).

SUMMARY

Although the embodiments of the present disclosure are not limited to specific advantages or functionality, it is noted that in accordance with the present disclosure, a method and laboratory equipment for fast detection of failure in laboratory equipment is provided.

In accordance with one embodiment of the disclosure, a computer-implemented method for determining failures in laboratory equipment is provided, the method comprising the rule generation steps: a) receiving a desired probability of false rejection ($\check{P}_{fr}$) and a desired error detection rate $\check{E}_D$, such as a desired probability of error detection ($\check{P}_{ed}$), relating to one or more QC levels (J) of quality control (QC) samples to be processed by the equipment; b) setting a number of runs (R) to one; c) calculating an error detection rate ($\hat{E}_D$) based at least partially on R; d) determining if $\hat{E}_D$ is below $\check{E}_D$, and if so: increase R by one, and repeat steps c) to d), and if not: define a rule for determining failures in the laboratory equipment based, at least partially, on R; the method further comprising rule application steps: e) receiving or collecting standardized QC results generated by the equipment, from at least R runs of QC samples; f) applying the rule defined in step d) to the standardized QC results; g) determining failures in the equipment, if the standardized QC results comply with the rule.

In accordance with another embodiment of the disclosure, laboratory equipment for determining failures in the equipment, by implementing the method of another embodiment of the disclosure is provided, the equipment comprising: a rule generator unit; a rule application unit; and a test result generating unit for generating results relating to at least one QC level (J) and relating to at least one different tests; wherein the equipment comprises means for: a) receiving, by the rule generator unit, a desired probability of false rejection ($\check{P}_{fr}$) and a desired error detection rate $\check{E}_D$, such as desired probability of error detection ($\check{P}_{ed}$), relating to one or more QC levels (J) of quality control (QC) samples; b) setting, by the rule generator unit, a number of runs (R) to one; c) calculating, by the rule generator unit, an error detection rate ($\vec{E}_D$) based at least on R; d) determining, by the rule generator unit, if $\vec{E}_D$ is below $\check{E}_D$, and if so: increase R by one, and repeat steps c) to d), and if not: define a rule for determining failures in the laboratory equipment based, at least partially, on R; e) collecting, by the rule application unit, standardized QC results, derived from at least R runs of QC samples generated by the test result generating unit; f) applying, by the rule application unit, the rule defined in step d) to the standardized QC results, collected in step e); g) determining, by the rule application unit, failures in the equipment, if the standardized QC results comply with the rule.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
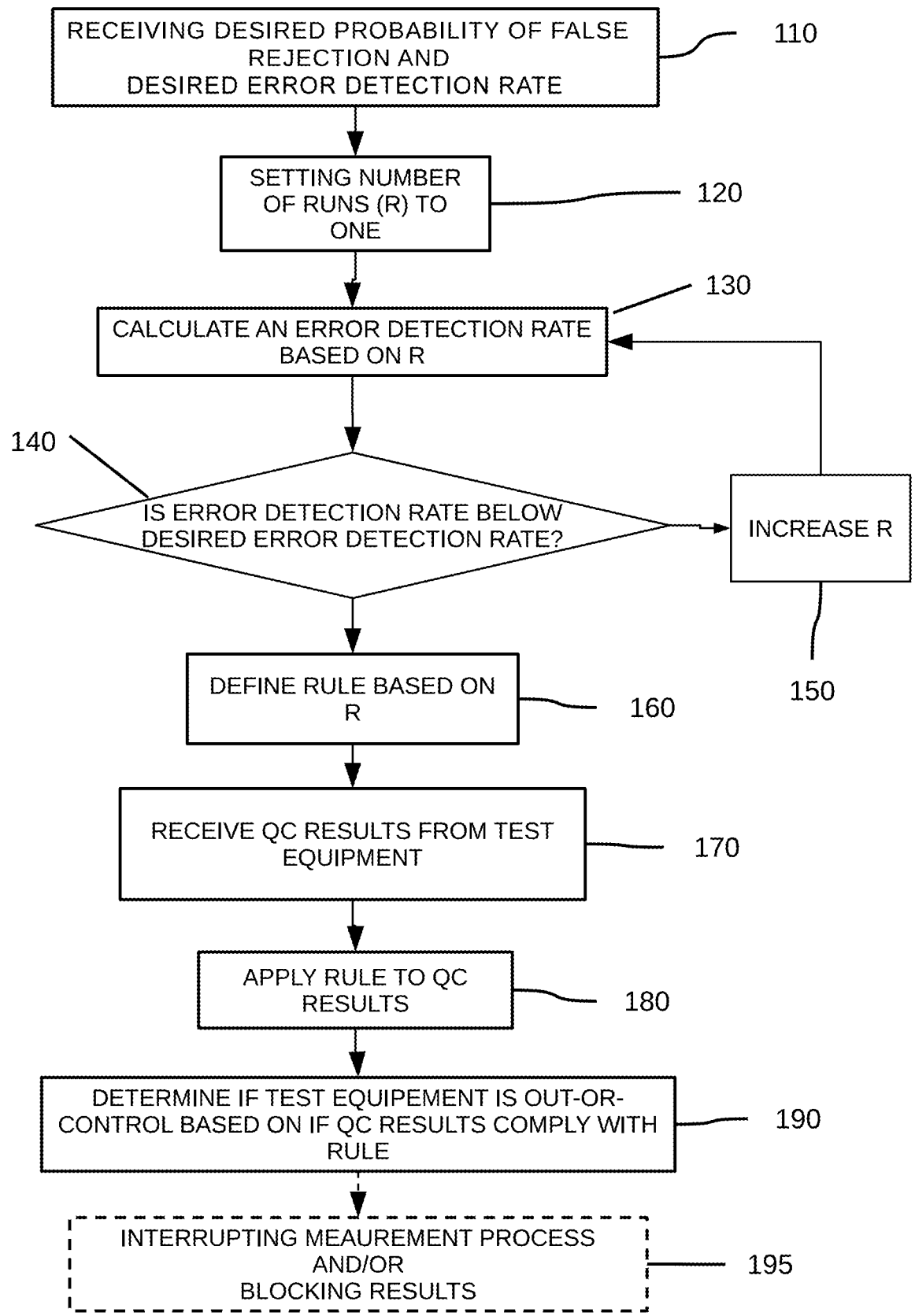
FIG. 1 shows steps of a method for determining laboratory test equipment failure in accordance with an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

Traditionally "Westgard rules" may be used to identify failures in laboratory equipment. Westgard rules may require unnecessary numbers of runs before identifying an out-of-control situation, and may therefore result in unnecessary wait times until results can be deemed reliable, leading to extra costs and longer wait times for patients. Further, Westgard rules provides several alternative rule combinations, without clear selection process, and are therefore complicated to implement and/or require huge training efforts. Westgard rules might be prone to being incorrectly implemented due to the complexity. The Westgard rules are further not adapted to samples including multiple diagnostic tests.

In particular, the deficiencies in the art is solved by a computer-implemented method for determining failures in an equipment, the method comprising the steps:
a) receiving a desired probability of false rejection ($\check{P}_{fr}$), a desired error detection measure ($\check{E}_D$), such as a desired probability of error detection ($\check{P}_{ed}$), relating to one or more QC levels (J) of quality control (QC) samples to be processed by the equipment;
b) setting a number of QC runs (R) to one;
c) calculating an error detection measure ($\hat{E}_D$) based at least partially on R;
d) determining if $\hat{E}_D$ is below $\check{E}_D$, and if so:
   increase R by one, and repeat steps c) to d), and
   if not:
   define a rule for determining failures in the laboratory equipment based, at least partially, on R;
e) receiving or collecting standardized QC results, typically from at least R runs of QC samples generated by the equipment;
f) applying the rule defined in step d) to the standardized QC results;
g) determining failures in the equipment, if the standardized QC results comply with the rule.

Although the embodiments of the present disclosure are not limited to specific advantages or functionality, the advantages include a simplified and fast detection of failure in laboratory test equipment. The advantages further include an improved design of statistical rules to quickly identify failures in laboratory equipment with fewer runs. Identifying failures fast improves patient safety by preventing incorrect results to be sent to clinicians, and allow early certainty for time-critical samples. Furthermore, the design is simple and may be automated more easily, facilitating use and increasing safety. The present disclosure is further suitable for equipment performing multiple diagnostic tests.

The received or collected standardized QC results in step e) may be generated from non-standardized QC test results. These QC test results may be measured by the laboratory equipment together with patients' samples.

In one embodiment, the rule defined in step d) includes a comparison with a squared distance ($d^2$), where $d^2$ is typically derived from the central chi-square distribution $$d^2 = C^{-1}(1-\check{P}_{fr}; DF), \text{ where } DF=J\times R; \text{ or}$$

alternatively from Hotelling's T-squared distribution; and wherein step f) typically includes calculating a Mahalanobis distance (M) for the J number of QC levels and the R number of the typically latest runs, and applying the rule in step f) includes determining if M is equal to or greater than $d^2$.

The Mahalanobis distance (M) is derived by the equation:

$$M = \sum_{j=1}^{J} \sum_{r=1}^{R} Z_{jr}^2$$

where $Z_{jr}$ is the standardized QC result from QC level j and run r; and
wherein $Z_{jr}$ is typically given by the equation $$Z_{jr} = (X_{jr} - \mu_j)/\sigma_j$$

where $X_{jr}$ is QC test results from QC level j and run r, and $\mu_j$ is the in-control central tendency, such as mean or median, and $\sigma_j$ is the in-control measure of dispersion, such as standard deviation or interquartile range, relating to QC level j, and where $\mu_j$ and $\sigma_j$ are typically derived from equipment validation test results.

Although the embodiments of the present disclosure are not limited to specific advantages or functionality, the advantages include a single, simple rule that can safely be automated to detect failures in laboratory equipment in few runs.

The non-standardized QC test results may be standardized by subtracting from the non-standardized QC test results, the in-control central tendency/bias ($\sigma_j$), and dividing the result of the subtraction by the in-control dispersion/standard deviation ($\mu_j$) for each QC level j.

The in-control bias and in-control variability may be calculated from validation test results for each QC level. These validation QC results may then be considered to be in-control (i.e., measured without influence of an out-of-control failure). The validation QC results may be at least 20, or at least 10, initial validation QC results used to derive the in-control bias (e.g., mean of the QC test results) and in-control standard deviation (e.g., standard deviation of the validation QC test results). The validation QC results as well as QC test results may have multivariate normal distribution with low or zero correlations across QC levels and runs.

In one embodiment, $\check{E}_D$ relates to a desired probability of systematic error detection ($\check{P}s_{ed}$) and to a critical systematic error ($\Delta_{SECrit}$), where $\Delta_{SECrit}$ may be defined $\Delta_{SECrit}=\sigma-z_{1-\alpha}$ with $z_{1-\alpha}$ as quantile of the standard normal distribution that evaluates to $1-\alpha$ and $\sigma$ defined $\sigma=(TE\alpha-|b|)/s$, where b is bias and s is imprecision aggregated over all QC levels and $TE\alpha$ is the allowable total error;
wherein $\hat{E}_D$ includes a systematic error detection ($\hat{P}_{Sed}$), and calculating in step c) includes deriving $\hat{P}_{Sed}$ from a cumulative distribution function of a non-central chi-squared distribution $H(d^2; DF, NCP)$, where $NCP=J\times R\times\Delta_{SECrit}^2$; and
wherein step d) includes determining if $\hat{P}_{Sed}$ is below $\check{P}_{Sed}$.

Although the embodiments of the present disclosure are not limited to specific advantages or functionality, the advantages include a method that may efficiently identify failure in the laboratory equipment that would result in a shift in test results.

Critical systematic error ($\Delta_{SECrit}$) may be defined $\Delta_{SECrit}=\sigma-Z_{1-\alpha}$ with $z_{1-\alpha}$ as quantile of the standard normal distribution that evaluates to $1-\alpha$ (the $z_{1-\alpha}$ quantile is about 1.65 for $\alpha=5\%$). The sigma metric a may specify the number of standard deviations being away from the upper limit of the allowable total error $TE\alpha$ when the QC measurement process is in control. The sigma metric may formally be defined $\sigma=(TE\alpha-|b|)/s$ with b as bias and s as standard deviation aggregated over all QC levels.

In one embodiment, $\check{E}_D$ relates to a desired probability of random error detection ($\check{P}_{Red}$) and to a critical random error ($\Delta_{RECrit}$), where $\Delta_{RECrit}$ may be defined by $\Delta_{RECrit}=\sigma/z_{1-\alpha}$ with $z_{1-\alpha}$ as quantile of the standard normal distribution that evaluates to $1-\alpha$ and $\sigma$ defined $\sigma=(TE\alpha-|b|)/s$ with b as bias and s as imprecision aggregated over all QC levels;
wherein $\hat{E}_D$ includes a random error detection ($\hat{P}_{Red}$), and calculating in step c) includes deriving $\hat{P}_{Red}$ from a cumulative distribution function of a gamma distribution $G(d^2; SH, SC)$, where $SH=(J\times R)/2$ and $SC=2\times\Delta_{RECrit}^2$; and
wherein step d) includes determining if $\hat{P}_{Red}$ is below $\check{P}_{Red}$.

Although the embodiments of the present disclosure are not limited to specific advantages or functionality, the advantages include a method that may efficiently identify failure in the laboratory equipment that would result in increased imprecision of the test results.

Where $\check{E}_D$ relates both to a desired probability of random error detection ($\check{P}_{Red}$) and to a desired probability of systematic error detection ($\check{P}s_{ed}$), determining (in step d)) may include determining if both $\hat{P}_{Sed}$ is below $\check{P}_{Sed}$ and $\hat{P}_{Red}$ is below $\check{P}_{Red}$, or if at least one of the conditions are met.

In one embodiment, step a) further includes receiving a maximum number of runs ($R_{Max}$);
wherein step d) further includes determining if $R>R_{Max}$, and if so:
determine that no rule is found; and
where $R_{Max}$ is typically 4 for J=2, and where $R_{Max}$ is typically 2 for J=3.

In one embodiment, each run is generating data from one, two, or more, typically less than 100, different diagnostic tests (I);
wherein step g) further includes applying a corrective function to the desired probability of false rejection ($\check{P}_{fr}$); and
wherein the corrective function typically is $\check{P}_{fr}/I$ or $1-(1-\check{P}_{fr})^{1/I}$.

In one embodiment, the steps b) to g) are performed separately for each diagnostic test; and a failure is determined to exist in the equipment if standardized QC results relating to any of the tests do not comply with a corresponding rule.

Although the embodiments of the present disclosure are not limited to specific advantages or functionality, the advantages include an increased speed of detecting out-of-control conditions, where several diagnostic tests are measured using QC samples.

In one embodiment, in response to determining failures in step g), the method further includes
h) interrupting a measurement process and/or blocking results, such as results generated after the R or R+1 latest QC run.

Although the embodiments of the present disclosure are not limited to specific advantages or functionality, the advantages include improved patient safety. Where the laboratory equipment utilizes so called bracketed QC strategy, a bracket may be the patient samples between two QC events. The laboratory may hold R number of brackets until the subsequent QC event has passed. If a failure is detected after a QC event, the R number of latest brackets' patient results may be blocked and determined unreliable.

In particular, although the embodiments of the present disclosure are not limited to specific advantages or functionality, laboratory equipment for determining failures in the equipment are provided herein, typically by implementing the method of an embodiment of the present disclosure, the equipment comprising:
a rule generator unit;
a rule application unit; and
a test result generating unit for generating results relating to at least one QC level (J) and relating to at least one, typically two or more, different tests (I);
wherein the equipment comprises means for:
a) receiving, by the rule generator unit, a desired probability of false rejection ($\check{P}_{fr}$) and desired error detection rate ($\check{E}_D$), such as desired probability of error detection ($\check{P}_{ed}$), relating to one or more QC levels (J) of quality control (QC) samples;
b) setting, by the rule generator unit, a number of runs (R) to one;

c) calculating, by the rule generator unit, an error detection rate ($\hat{E}_D$) based at least on R;
d) determining, by the rule generator unit, if $\hat{E}_D$ is below $\check{E}_D$, and if so:
increase R by one, and repeat steps c) to d), and
if not:
define a rule for determining failures in the laboratory equipment based, at least partially, on R;
e) collecting, by the rule application unit, standardized QC results, typically derived from at least R runs of QC samples generated by the test result generating unit;
f) applying, by the rule application unit, the rule defined in step d) to the standardized QC results, collected in step e);
g) determining, by the rule application unit, failures in the equipment, if the standardized QC results comply with the rule.

Although the embodiments of the present disclosure are not limited to specific advantages or functionality, the advantages include a simplified and fast detection of failure in laboratory equipment. The advantages further include an improved design of statistical rules to quickly identify failures in laboratory equipment with fewer runs.

In one embodiment, the equipment further comprising a display; wherein when the rule application unit determines that a failure exists in the equipment, causes the display to indicate that a failure exists in the equipment.

Although the embodiments of the present disclosure are not limited to specific advantages or functionality, the advantages include signalling to laboratory personnel that a failure is present in the laboratory equipment resulting in out-of-control patient samples, and that certain amount of patients samples (such as those after the latest R or R+1 QC events) are unreliable. The laboratory equipment may also signal a message via wired and/or wireless communication to affected laboratory personnel, clinicians, and/or patients indicating the failure and/or unreliable result and/or estimation of delay for providing reliable results.

In one embodiment, each run is generating data from two or more, typically less than 100, different diagnostic tests (I);
wherein step g) further includes applying a corrective function to the desired probability of false rejection ($\check{P}_{fr}$);
wherein the corrective function typically includes $\check{P}_{fr}/I$ or $1-(1-\check{P}_{fr})^{1/I}$; and wherein the steps b) to g) are performed separately for each diagnostic test; and a failure is determined to exist in the equipment if the standardized QC results relating to any of the tests do not comply with the corresponding rule.

Although the embodiments of the present disclosure are not limited to specific advantages or functionality, the advantages include an increased speed of detecting out-of-control conditions, where several diagnostic tests are measured in each QC sample.

In one embodiment, the display indicates which of the different diagnostic tests the standardized QC results that do not comply with the rule, relates to.

When a rule is applied separately for each diagnostic test, the laboratory equipment might indicate on the display, which of the diagnostic tests are affected by the out-of-control failure. This assists in locating and correcting the failure.

In one embodiment, the display indicates if the detected failure is a systematic error or a random error. A central tendency (such as mean) of QC results affected by random error failure may not substantially deviate from the in-control central tendency (such as mean), while a central tendency (such as mean) of QC results affected by a systematic failure may result in a central tendency (such as mean) that substantially deviates from the in-control mean.

A dispersion (such as standard deviation) of QC results affected by random error failure may substantially deviate from the in-control dispersion (such as standard deviation). A dispersion (such as standard deviation) of QC results affected by systematic error failure may not substantially deviate from the in-control dispersion (such as standard deviation).

The central tendency and/or dispersion of the out-of-control QC results may therefore be used to determine the type of failure (systematic or random). The indication of the type of error may assist in locating and correcting the failure.

In one embodiment, the equipment, in response to determining failures in step g), further comprises means for:

h) interrupting a measurement process and/or blocking results, such as results generated after the R or R+1 latest QC run.

Although the embodiments of the present disclosure are not limited to specific advantages or functionality, the advantages include improved patient safety. Where the laboratory equipment utilizes so called bracketed QC strategy, a bracket may be the patient samples between two QC events. The laboratory may hold R number of brackets until the subsequent QC event has passed. If a failure is detected after a QC event, the patient samples of the held R number of latest brackets may be blocked.

In particular, the object is solved by a computer-readable medium comprising instructions which, when executed by a computer, cause the computer to carry out the steps of one of the above-stated methods.

Although the embodiments of the present disclosure are not limited to specific advantages or functionality, the benefits and advantages of the medium is equal, or similar to, the advantages of the above-mentioned method.

In order that the embodiments of the present disclosure may be more readily understood, reference is made to the following examples, which are intended to illustrate the disclosure, but not limit the scope thereof.

FIG. 1 shows a method for determining laboratory equipment failure. The method may contain the steps: receiving 110 a desired probability of false rejection ($\check{P}_{fr}$) and a desired error detection rate ($\check{E}_D$), such as a desired probability of error detection ($\check{P}_{ed}$), relating to one or more QC levels (J) of quality control (QC) samples to be processed by the equipment; setting 120 a number of runs (R) to one; calculating 130 an error detection rate ($\hat{E}_D$) based at least partially on R; determining 140 if $\hat{E}_D$ is below $\check{E}_D$, and if so: increase 150 R by one, and repeat steps c) to d), and if not: define 160 a rule for determining failures in the laboratory equipment based, at least partially, on R; receiving or collecting 170 standardized QC results, typically from at least R runs of QC samples generated by the equipment; applying 180 the rule defined in step d) to the standardized QC results; and determining 190 failures in the equipment, if the standardized QC results comply with the rule. The method may further optionally include interrupting 195 the measurement process and/or blocking results, such as results generated after the R or R+1 latest QC run.

The step of calculating 130 an error detection measure ($\hat{E}_D$), may include any, or separately all, of: calculating a systematic error detection ($\hat{P}_{Sed}$) from a cumulative distribution function of a non-central chi-squared distribution H($d^2$; DF, NCP), where NCP=J×R×$\Delta_{SECrit}^2$, and calculating a random error detection ($\hat{P}_{Red}$) from a cumulative distribution function of a gamma distribution G($d^2$; SH, SC), where SH=(J×R)/2 and SC=2×$\Delta_{RECrit}^2$.

The step of determining 140 if $\hat{E}_D$ is below $\check{E}_D$ may, depending on if systematic error detection ($\hat{P}_{Sed}$) and/or random error detection ($\hat{P}_{Red}$) is targeted, include: determining if $\hat{P}_{Sed}$ is below $\check{P}_{Sed}$, and/or if $\hat{P}_{Red}$ is below $\check{P}_{Red}$. If so, increase 150 R by one, and repeat steps 130 to 140, and if not, define 160 a rule for determining failures in the laboratory equipment based, at least partially, on R.

The receiving or collecting step 170, may include standardizing QC test results by the equation $Z_{jr}=(X_{jr}-\mu_j)/\sigma_j$, where $X_{jr}$ is non-standardized (raw) QC test results from QC level j and run r, $\mu_j$ may be in-control mean, and $\sigma_j$ may be in-control standard deviation relating to QC level j. The runs r=1 to R, are the R latest runs.

Applying 180 the rule may include determining if a Mahalanobis distance (M) is given by the equation $M=\sum_{j=1}^{J}\sum_{r=1}^{R}Z_{jr}^2$, is equal or greater than a squared distance ($d^2$). $d^2$ may be derive from the central chi-square distribution $d^2=C^{-1}(1-\check{P}_{fr}; DF)$, where DF=J×R, or $d^2$ may be derived from Hotelling's T-squared distribution $d^2=T^2(1-\check{P}_{fr}, DF)$, where DF=J×R.

Figure 2:
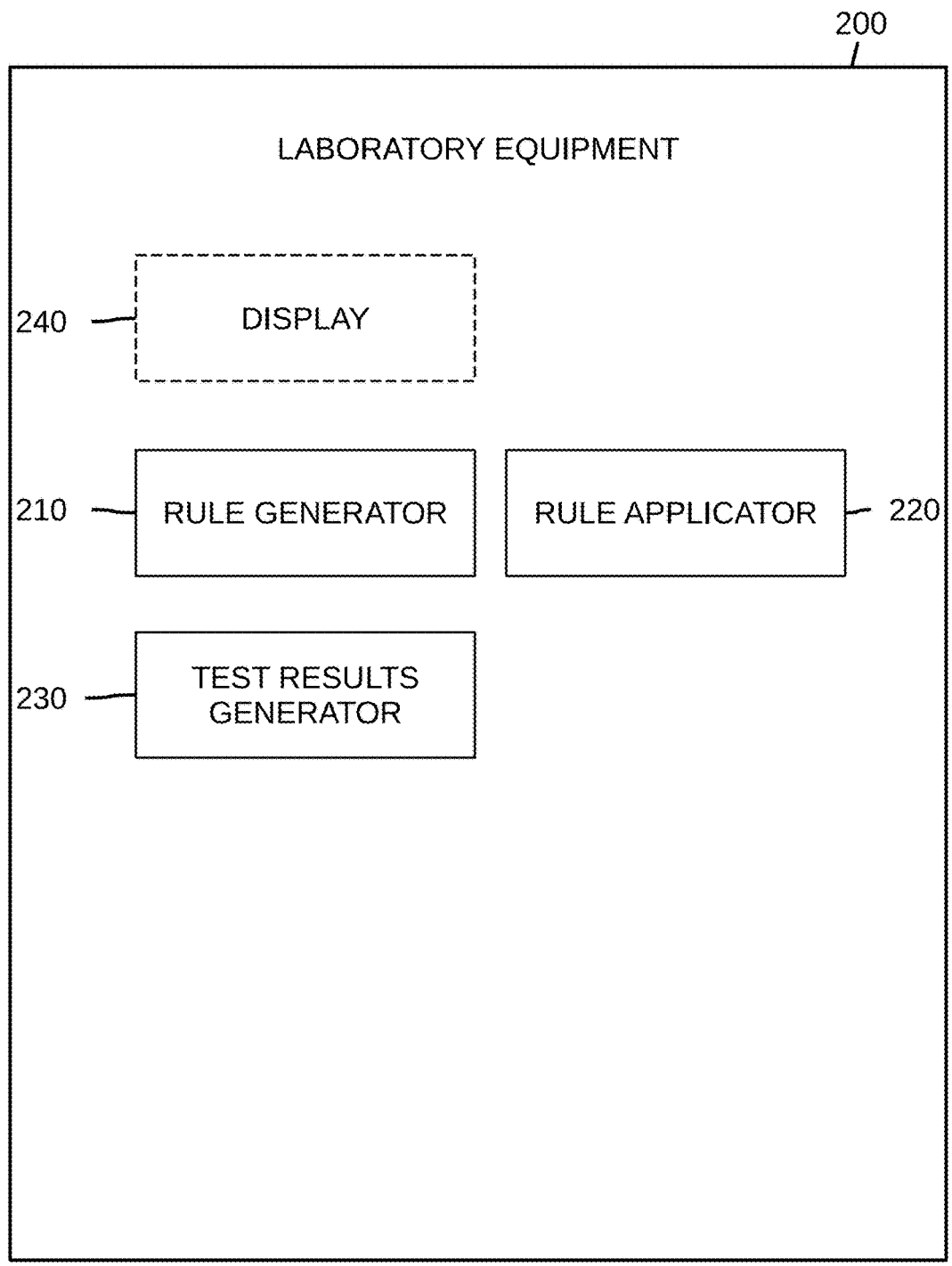
FIG. 2 shows laboratory equipment according to an embodiment of the present disclosure.

FIG. 2 shows laboratory equipment 200 according to an embodiment of the present disclosure. The laboratory equipment may include: a rule generator unit 210; a rule application unit 220; and a test result generating unit 230. The laboratory equipment may further optionally include a display 240.

Validation samples, QC samples, and patients' samples may be inserted into the test result generation unit 230 to generate a test results. The rule generator unit 210 may be adapted to receive a requirement on desired probability of false rejection ($\check{P}_{fr}$) and desired error detection measure ($\check{E}_D$) and generate a rule as described above.

The rule application unit 220 may be adapted to receive or generate standardized QC results and apply the rule generated by the rule generator unit 210 as described above to determine if a failure is present in the laboratory equipment. The display 240 may be used to display information to users as described above.

What is claimed is:

1. A computer-implemented method for determining out-of-control failures in laboratory equipment to efficiently improve safety for one or more patients, the method comprising:

a) receiving a desired probability of false rejection ($\check{P}_{fr}$) and a desired error detection rate ED relating to one or more QC levels (J) of quality control (QC) samples to be processed by the laboratory equipment, wherein the laboratory equipment is structured to perform multiple different types of diagnostic tests and to test a particular substance of a patient's sample;

b) setting a number of runs (R) to one;

c) calculating an error detection rate ($\hat{E}_D$) based at least partially on R;

d) determining if ÊD is below ĚD, and
if so:
   increase R by one, and repeat steps c) to d), and
if not:
   define a rule for determining out-of-control failures in the laboratory equipment based, at least partially, on R;

e) receiving or collecting standardized QC results by operating the laboratory equipment structured to perform multiple different types of diagnostic tests, on R runs of QC samples, wherein the R runs of the QC samples is less than a quantity of runs required under Westgard rules to obtain standardized QC results;
f) applying the rule defined in step d) to the standardized QC results;
g) determining if out-of-control failures exist in the laboratory equipment that is structured to perform multiple different types of diagnostic tests based on determining whether the standardized QC results generated from the R runs of QC samples comply with the rule; and
interrupting a measurement process of samples to be processed by the laboratory equipment in response to determining, in step g), that an out-of-control failure exists in the laboratory equipment to efficiently improve safety for one or more patients associated with the samples in a bracket of a bracketed quality control system based on less than the quantity of runs required under Westgard rules.

2. The method of claim 1,
wherein the rule defined in step d) includes a comparison with a squared distance ($d^2$), where $d^2$ is derived from the central chi-square distribution:

$$d^2 = C^{-1}(1-\check{P}_{fr}; DF), \text{ where } DF = J \times R; \text{ or}$$

from Hotelling's T-squared distribution; and
wherein step f) includes calculating a Mahalanobis distance (M) for the J number of QC levels and the R number of the latest runs, and wherein applying the rule in step f) includes determining if M is equal to or greater than $d^2$.

3. The method of claim 2,
wherein the Mahalanobis distance (M) is given by the equation:

$$M = \sum_{j=1}^{J} \sum_{r=1}^{R} Z_{jr}^2$$

where $Z_{jr}$ is the standardized QC result from QC level j and run r; and
wherein $Z_{jr}$ is given by the equation:

$$Z_{jr} = (X_{jr} - \mu_j)/\sigma_j$$

where $X_{jr}$ is QC test results from QC level j and run r, and $\mu_j$ is the in-control central tendency, such as mean or median, and $\sigma_j$ is the in-control measure of dispersion, such as variation, standard deviation, or interquartile range, relating to QC level j, and where $\mu_j$ and $\sigma_j$ are derived from equipment validation test results.

4. The method of claim 1,
wherein $\check{E}_D$ relates to a desired probability of systematic error detection ($\check{P}_{Sed}$) and to a critical systematic error ($\Delta_{SECrit}$), where $\Delta_{SECrit}$ may be defined $\Delta_{SECrit} = \sigma \cdot z_{1-\alpha}$ with $z_{1-\alpha}$ as quantile of the standard normal distribution that evaluates to $1-\alpha$ and $\sigma$ defined $\sigma = (TE\alpha - |b|)/s$ with b as bias, s as standard deviation aggregated over all QC levels, and TEa is an allowable total error;
wherein $\hat{E}D$ includes a systematic error detection ($\hat{P}_{Sed}$), and calculating in step c) includes deriving $\hat{P}_{Sed}$ from a cumulative distribution function of a non-central chi-squared distribution $H(d^2; DF, NCP)$, where $NCP = J \times R \times \Delta_{SECrit}^2$, $DF = J \times R$, and $d^2$ is a squared distance; and
wherein step d) includes determining if $\hat{P}_{Sed}$ is below $\check{P}_{Sed}$.

5. The method of claim 1,
wherein $\check{E}_D$ relates to a desired probability of random error detection ($\check{P}_{Red}$) and to a critical random error ($\Delta_{RECrit}$), where $\Delta_{RECrit}$ may be defined by $\Delta_{RECrit} = \sigma/z_{1-\alpha}$ with $z_{1-\alpha}$ as quantile of the standard normal distribution that evaluates to $1-\alpha$ and $\sigma$ defined $\sigma = (TE_\alpha - |b|)/s$ with b as bias, s as standard deviation aggregated over all QC levels, and TE$\alpha$ is an allowable total error;
wherein $\hat{E}D$ includes a random error detection ($\hat{P}_{Red}$), and calculating in step c) includes deriving $\hat{P}_{Red}$ from a cumulative distribution function of a gamma distribution $G(d^2; SH, SC)$, where $SH = (J \times R)/2$ and $SC = 2 \times \Delta_{RECrit}^2$; and
wherein step d) includes determining if $\hat{P}_{Red}$ is below $\check{P}_{Red}$.

6. The method of claim 1,
wherein step a) further includes receiving a maximum number of runs ($R_{Max}$);
wherein step d) further includes determining if $R > R_{Max}$, and if so:
determine that no rule is found; and
where $R_{Max}$ is 4 for J=2, and where $R_{Max}$ is 2 for J=3.

7. The method of claim 1, further comprising generating data from two or more different diagnostic tests (I); and
wherein step g) further includes applying a corrective function to the desired probability of false rejection ($\underline{\check{P}}_{fr}$); and
wherein the corrective function is:

$$\check{P}_{fr}/I$$

or $$1-(1-\check{P}_{fr})^{1/I}.$$

8. The method of claim 7,
wherein the steps b) to g) are performed separately for each diagnostic test; and an out-of-control failure is determined to exist in the laboratory equipment if standardized QC results relating to any of the diagnostic tests do not comply with a corresponding rule.

9. The method of claim 1, wherein the desired error detection rate $\check{E}_D$ comprises a desired probability of error detection ($\check{P}_{ed}$).

10. Laboratory equipment for determining out-of-control failures in the equipment to efficiently improve safety for one or more patients, the laboratory equipment comprising:
a processor; and
a non-transitory computer-readable storage medium comprising instructions stored thereon which, when executed by processor, causes the laboratory equipment to perform steps including:
a) generating results relating to at least one QC level (J) and relating to at least one different diagnostic test, wherein the laboratory equipment is structured to perform multiple different types of diagnostic tests;
b) receiving a desired probability of false rejection ($\check{P}_{fr}$) and a desired error detection rate $\check{E}_D$ relating to one or more QC levels (J) of quality control (QC) samples;
c) setting a number of runs (R) to one;
d) calculating an error detection rate ($\hat{E}_D$) based at least on R;
e) determining if $\hat{E}_D$ is below $\check{E}_D$, and
if so:
increasing R by one, and repeating steps d) to e), and
if not:
defining a rule for determining out-of-control failures in the laboratory equipment based, at least partially, on R;
f) collecting standardized QC results through operation of the laboratory equipment structured to perform multiple different types of diagnostic tests, on R runs of QC samples, wherein the R runs of the QC samples is less than a quantity of runs required under Westgard rules to obtain standardized QC results;

g) applying the rule defined in step e) to the standardized QC results, collected in step f);

h) determining if out-of-control failures exist in the laboratory equipment that is structured to perform multiple different types of diagnostic tests based on determining whether the standardized QC results generated from the R runs of QC samples comply with the rule; and interrupting a measurement process of samples to be processed by the laboratory equipment in response to determining, in step h), that an out-of-control failure exists in the laboratory equipment to efficiently improve safety for one or more patients associated with the samples in a bracket of a bracketed quality control system based on less than the quantity of runs required under Westgard rules;

wherein the laboratory equipment is structured to test a particular substance of a patient's sample.

11. The laboratory equipment of claim 10, further comprising a display; and wherein in response to determining that an out-of-control failure exists in the laboratory equipment, the plurality of instructions further cause the display to indicate that an out-of-control failure exists in the laboratory equipment.

12. The laboratory equipment of claim 11, wherein the display indicates if the determined out-of-control failure is a systematic error or a random error.

13. The laboratory equipment of claim 10, wherein each run generates data from two or more different diagnostic tests (I);

wherein step h) further includes applying a corrective function to the desired probability of false rejection ($\check{P}_{fr}$);

wherein the corrective function includes:

$$\check{P}_{fr}/I$$

or $$1-(1-\check{P}_{fr})^{1/I}, \text{ and}$$

wherein the steps c) to h) are performed separately for each diagnostic test; and an out-of-control failure is determined to exist in the laboratory equipment if the standardized QC results relating to any of the diagnostic tests do not comply with a corresponding rule.

14. The laboratory equipment of claim 13, further comprising a display; and wherein the plurality of instructions further cause the display to indicate which of the two or more different diagnostic tests relate to the standardized QC results determined not to comply with the corresponding rule.

15. The laboratory equipment of claim 10, wherein the desired error detection rate ED comprises a desired probability of error detection ($\check{P}_{ed}$).

16. A non-transitory computer-readable medium comprising instructions which, when executed by a computer, cause the computer to perform steps to efficiently improve safety for one or more patients including:

a) receiving a desired probability of false rejection ($\check{P}_{fr}$) and a desired error detection rate $\check{E}_D$ relating to one or more QC levels (J) of quality control (QC) samples to be processed by laboratory equipment that is structured to perform multiple different types of diagnostic tests to and test a particular substance of a patient's sample;

b) setting a number of runs (R) to one;

c) calculating an error detection rate ($\hat{E}_D$) based at least partially on R;

d) determining if $\hat{E}_D$ is below $\check{E}_D$, and if so:

increase R by one, and repeat steps c) to d), and if not:

define a rule for determining out-of-control failures in the laboratory equipment based, at least partially, on R;

e) receiving or collecting standardized QC results generated through operation of the laboratory equipment structured to perform multiple different types of diagnostic tests, on R runs of QC samples, wherein the R runs of the QC samples is less than a quantity of runs required under Westgard rules to obtain standardized QC results;

f) applying the rule defined in step d) to the standardized QC results;

g) determining if out-of-control failures exist in the laboratory equipment that is structured to perform multiple different types of diagnostic tests based on determining whether the standardized QC results generated from the R runs of QC samples comply with the rule; and interrupting a measurement process of samples to be processed by the laboratory equipment in response to determining, in step g), that an out-of-control failure exists in the laboratory equipment to efficiently improve safety for one or more patients associated with the samples in a bracket of a bracketed quality control system based on less than the quantity of runs required under Westgard rules.

* * * * *